United States Patent
Fujiyoshi et al.

(10) Patent No.: US 10,661,779 B2
(45) Date of Patent: May 26, 2020

(54) CONTROL SYSTEM FOR HYBRID VEHICLE

(71) Applicant: TOYOTA JIDOSHA KABUSHIKI KAISHA, Toyota-shi, Aichi-ken (JP)

(72) Inventors: Tadashi Fujiyoshi, Susono (JP); Junichi Deguchi, Susono (JP); Akihiro Fujimoto, Susono (JP); Hideki Kubonoya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/155,103

(22) Filed: Oct. 9, 2018

(65) Prior Publication Data

US 2019/0105993 A1    Apr. 11, 2019

(30) Foreign Application Priority Data

Oct. 11, 2017  (JP) .................. 2017-197605

(51) Int. Cl.
| | |
|---|---|
| *B60W 20/00* | (2016.01) |
| *B60W 10/06* | (2006.01) |
| *B60W 10/08* | (2006.01) |
| *B60W 20/13* | (2016.01) |
| *B60L 50/61* | (2019.01) |

(Continued)

(52) U.S. Cl.
CPC ............ *B60W 20/13* (2016.01); *B60K 6/46* (2013.01); *B60L 50/61* (2019.02); *B60L 53/16* (2019.02); *B60L 58/13* (2019.02); *B60W 10/06* (2013.01); *B60W 10/08* (2013.01); *B60W 10/26* (2013.01); *B60W 20/10* (2013.01); *B60K 6/28* (2013.01); *B60K 6/44* (2013.01); *B60L 50/16* (2019.02); *B60L 2240/12* (2013.01);

(Continued)

(58) Field of Classification Search
CPC ...... B60W 20/13; B60W 20/10; B60W 10/06; B60W 10/08; B60W 10/26; B60L 50/61; B60L 53/16; B60L 58/13; B60K 6/46
USPC .................................... 180/65.265
See application file for complete search history.

(56) References Cited

U.S. PATENT DOCUMENTS

| 10,189,464 B2 * | 1/2019 | Aridome ............... B60W 10/08 |
| 2013/0066495 A1 | 3/2013 | Furuta |

(Continued)

FOREIGN PATENT DOCUMENTS

| DE | 10 2010 029 443 A1 | 12/2011 |
| DE | 10 2015 111 179 A1 | 1/2016 |

(Continued)

*Primary Examiner* — John D Walters
(74) *Attorney, Agent, or Firm* — Oliff PLC

(57) ABSTRACT

A control system for a hybrid vehicle configured to generate a required power continuously even if a large power is required frequently. An operating mode of the hybrid vehicle is selected from HV mode and EV mode, and in the hybrid vehicle, a drive power established by generating maximum output power of the engine is smaller than a drive power established by supplying a maximum electric power to the motor from the electric storage device. A controller is configured to shift the operating mode from the EV mode to the HV mode when an SOC level of a battery falls below a threshold level, and to raise the threshold level when a required running condition in the electric vehicle mode is a condition that cannot be achieved by the engine without operating the motor given that the hybrid vehicle is propelled in the hybrid mode.

7 Claims, 4 Drawing Sheets

(51) Int. Cl.
*B60L 53/16* (2019.01)
*B60L 58/13* (2019.01)
*B60W 20/10* (2016.01)
*B60K 6/46* (2007.10)
*B60W 10/26* (2006.01)
*B60L 50/16* (2019.01)
*B60K 6/28* (2007.10)
*B60K 6/44* (2007.10)

(52) U.S. Cl.
CPC ... *B60W 2510/244* (2013.01); *B60W 2552/25* (2020.02); *B60W 2710/244* (2013.01)

(56) References Cited

U.S. PATENT DOCUMENTS

2015/0073639 A1\* 3/2015 Minarcin .............. B60W 20/12
 701/22
2016/0023649 A1 1/2016 Muller et al.
2016/0311304 A1 10/2016 Niwa

FOREIGN PATENT DOCUMENTS

| JP | 2013-056613 A | 3/2013 |
| JP | 2016-41584 A | 3/2016 |
| WO | 2012/085295 A1 | 6/2012 |

\* cited by examiner

CONTROL SYSTEM FOR HYBRID VEHICLE

CROSS REFERENCE TO RELATED APPLICATIONS

The present disclosure claims the benefit of Japanese Patent Application No. 2017-197605 filed on Oct. 11, 2017 with the Japanese Patent Office, the disclosure of which is incorporated herein by reference in its entirety.

BACKGROUND

Field of the Invention

Embodiments of the present disclosure relate to the art of a control system for a hybrid vehicle propelled by an output power of a battery and an output power of an engine, and more particularly to a control system for a hybrid vehicle in which a maximum drive power established by the output power of the battery is greater than a maximum output power of the engine.

Discussion of the Related Art

JP-A-2013-56613 describes a power supply control apparatus for a series hybrid vehicle propelled by supplying electricity to a motor from a generator and a battery. The control apparatus taught by JP-A-2013-56613 is configured to select electric vehicle mode in which the vehicle is propelled by supplying electricity to the motor from only the battery while stopping the engine, when a SOC level of the battery is higher than a first SOC level. Further, the control apparatus selects first hybrid mode in which the engine is operated at a vehicle speed not less than a predetermined speed when a SOC level of the battery becomes a first SOC level, and selects second hybrid mode in which the engine is operated all the time when the SOC level of the battery becomes a second SOC level which is lower than the first SOC level. In the hybrid vehicle described in JP-A-2013-56613, if the SOC level of the battery falls below the second SOC level, the engine may be started even if the vehicle is propelled at a low speed. In order to prevent such undesirable activation of the engine, the control apparatus taught by JP-A-2013-56613 is further configured to prevent a reduction in the SOC level during propulsion in the first hybrid mode. According to the teachings of JP-A-2013-56613, specifically, control apparatus lowers the predetermined speed for starting engine with a reduction in an average vehicle speed from the predetermined speed, or with a raise in the SOC level of the battery from a predetermined level.

In the hybrid vehicle described in JP-A-2013-56613, the engine can generate a relatively large power. Therefore, the hybrid vehicle can be propelled in the first hybrid mode by supplying electricity to the battery from the engine while achieving a required power by the engine. However, if the maximum output power of the engine is small, the electricity may not be supplied sufficiently to the battery from the engine to generate the required power. In this case, the electricity has to be supplied to the motor from the battery to generate the required power, and hence the SOC level of the battery falls even if the engine is activated. Consequently, when the SOC level of the battery falls to a lower limit level, the electricity may not be supplied to the motor from the battery, and the vehicle has to be powered only by the engine. In this situation, the required power may not be generated only by the engine.

SUMMARY

Aspects of embodiments of the present disclosure have been conceived noting the foregoing technical problems, and it is therefore an object of the present disclosure to provide a control system for hybrid vehicles configured to generate a required power continuously even if a large power is required frequently.

The control system according to the embodiment of the present disclosure is applied to a hybrid vehicle comprising an engine, a motor, and an electric storage device that supplies an electric power to the motor. In the hybrid vehicle, an operating mode is selected from a hybrid mode in which the hybrid vehicle is propelled by a power generated by the engine, and an electric vehicle mode in which the hybrid vehicle is propelled by supplying the electric power to the motor from the electric storage device while stopping the engine. In addition, in the hybrid vehicle, a drive power established by generating maximum output power of the engine is smaller than a drive power established by supplying a maximum electric power to the motor from the electric storage device. In order to achieve the above-explained objective, according to the embodiment of the present disclosure, a controller is configured to: shift the operating mode from the electric vehicle mode to the hybrid mode when a state of charge level of the electric storage device falls below a threshold level; and raise the threshold level when a required running condition during propulsion in the electric vehicle mode is a condition that cannot be achieved by operating the engine without supplying the electric power to the motor from the electric storage device given that the hybrid vehicle is propelled in the hybrid mode.

In a non-limiting embodiment, the required sinning condition may include a required power, and the controller may be further configured to raise the threshold level when the required power is greater than the drive power established by generating the maximum output power of the engine.

In a non-limiting embodiment, the controller may be further configured to calculate an integral energy by integrating a difference between the required power greater than a predetermined power and the predetermined power during propulsion in the electric vehicle mode, and to raise the threshold level to a level corresponding to an increase in the integral energy.

In a non-limiting embodiment, the predetermined power may include the drive power established by generating the maximum output power of the engine.

In a non-limiting embodiment, the controller may be further configured to obtain an altitude at a current location, and to correct the integral energy such that the integral energy is increased as the altitude increases.

In a non-limiting embodiment, the controller may be further configured to calculate an expected possible running period from a current point of time given that the operating mode is shifted to the hybrid mode at the current point of time based on a remaining fuel amount and the state of charge level of the electric storage device, and to calculate the integral energy by integrating the difference between the required power greater than the predetermined power and the predetermined power over a past period of time corresponding to the expected possible running period.

In a non-limiting embodiment, the controller may be further configured to control an output power of the engine and an output power of the electric storage device to maintain a constant ratio between an energy amount of the fuel supplied to the engine and the state of charge level of the electric storage device, when the state of charge level of the electric storage device falls below the threshold level so that the operating mode is shifted from the electric vehicle mode to the hybrid mode.

In a non-limiting embodiment, the control system may further comprise a generator that translates the power of the engine into an electric power. In addition, the hybrid mode may include a mode in which the motor is operated to generate a power by supplying the electric power generated by the generator at least partially.

Thus, according to the embodiments of the present disclosure, the controller raises the threshold level of the state of charge level of the electric storage device when the running condition that cannot be achieved by the engine without operating the motor is required during propulsion in the electric vehicle mode. Specifically, the threshold level of the state of charge level is raised in such a manner as to advance a timing to shift the operating mode from the electric vehicle mode to the hybrid vehicle mode when the running condition that cannot be achieved by the engine without consuming the electric power in the hybrid mode is required during propulsion in the electric vehicle mode. According to the embodiment of the present disclosure, therefore, the state of charge level of the electric storage device can be maintained to a higher level when shifting the operating mode to the hybrid mode. For this reason, a period of time that the state of charge level of the electric storage device falls to the lower limit level can be elongated even when the hybrid vehicle is propelled by a power generated by operating the engine while operating the motor by supplying the electric power to the motor from the electric storage device, after shifting the operating mode from the electric vehicle mode to the hybrid mode. That is, the motor is allowed to output power using the electric power accumulated in the electric storage device for a longer period of time. In other words, the electric power can be supplied continuously to the motor from the electric storage device even if a large power is required frequently. For this reason, a required power can be achieved continuously.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
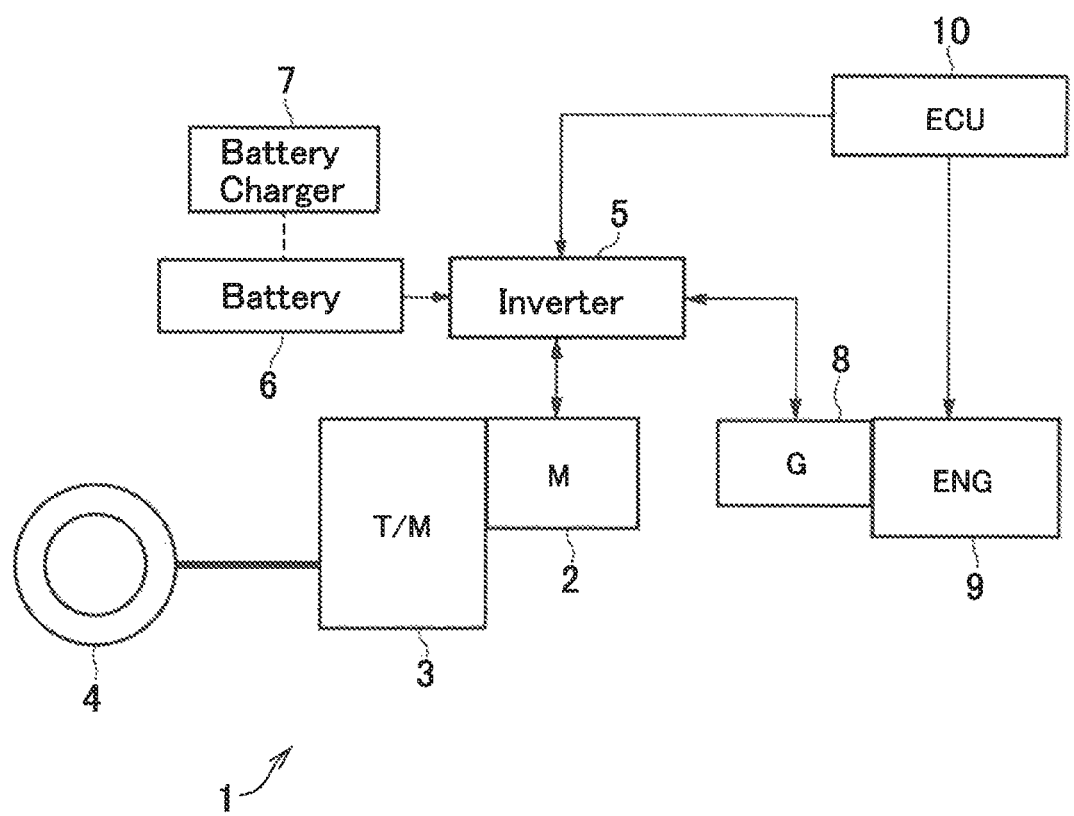
FIG. 1 is a schematic illustration showing one example of a configuration of a hybrid vehicle according to the embodiment of the present disclosure.

Referring now to FIG. 1, there is schematically shown a hybrid vehicle 1 to which a control system according to the embodiment of the present disclosure is applied. The hybrid vehicle 1 is a so-called a "series type" hybrid vehicle comprising a motor 2 that generates a power for propelling the hybrid vehicle 1. For example, a permanent magnet type synchronous motor or an induction motor having a generating function, that is, a motor-generator may be adopted as the motor 2. That is, the motor 2 is configured not only to generate a power in accordance with electricity supplied thereto but also to translate a mechanical energy into an electric energy by generating a brake torque.

At least one pair of drive wheels 4 is connected to an output shaft (not shown) of the motor 2 through a speed reducing mechanism 3. For example, a geared transmission, a continuously variable transmission, a transmission having a fixed gear ratio etc. may be adopted as the speed reducing mechanism 3. Here, it is to be noted that only one drive wheel 4 is shown in FIG. 1 for the sake of illustration.

The first motor 2 is connected to an electric storage device (as will be called the "battery" hereinafter) 6 through an inverter. Therefore, the motor 2 may be operated selectively as a motor and a generator by controlling an electric power as a product of a voltage and a current supplied to the motor 2 by the inverter 5.

The battery 6 may be charged with an electric power supplied from an external battery charger 7 connected with the battery 6 through a dashed line in FIG. 1. Thus, the hybrid vehicle 1 shown in FIG. 1 is a plug-in hybrid vehicle.

The battery 6 and the motor 2 are also connected electrically with a generator 8 through the inverter 5, and an engine 9 is connected to a rotary shaft (not shown) of the generator 8. In the hybrid vehicle 1, therefore, an output power of the engine 9 is translated into an electric power by the generator 8, and the electric power thus translated by the generator 8 is supplied to the motor 2 and the battery 6.

An operating mode of the hybrid vehicle 1 may be selected from an electric vehicle mode (to be abbreviated as the "EV mode" hereinafter) in which the hybrid vehicle 1 is powered by supplying an electric power to the motor 2 only from the battery 6 while stopping the engine 9, and a hybrid mode (to be abbreviated as the "HV mode" hereinafter) in which the hybrid vehicle 1 is powered by the motor 2 by supplying an electric power to the motor 2 from the generator 8 while operating the engine 9. In the HV mode, an electric power may also be supplied to the motor 2 from the battery 6.

The hybrid vehicle 1 is configured as so-called a range extender vehicle. Specifically, the hybrid vehicle 1 is propelled in the EV mode in a normal condition, and when a state of charge level (to be abbreviated as an "SOC" hereinafter) of the battery 6 falls below a predetermined level, the engine 9 is started to maintain the SOC level higher than a lower limit level. In the hybrid vehicle 1, therefore, an engine whose maximum output power is relatively small may be adopted as the engine 9. Specifically, a drive power as a product of a drive force and a vehicle speed established by generating maximum output power of the engine 9, in other words, a maximum power established by an electric power supplied to the motor 2 through the generator 8, is smaller than a drive power established by supplying a maximum electric power to the motor 2 from the battery 6.

In order to select the operating mode while controlling the engine 9 and the inverter 5, an electronic control unit (to be abbreviated as the "ECU" hereinafter) 10 as a controller of the embodiment is connected to the engine 9 and the inverter 5. The ECU 10 is composed mainly of a microcomputer, and various data is transmitted to the ECU 10 from sensors. For example, the ECU 10 receives information about a vehicle speed, a position of an accelerator pedal, a speed of the motor 2, a speed of an output shaft (not shown) of the engine 9, an output speed of the speed reducing mechanism 3, a temperature of the battery 6, an SOC level of the battery 6 and so on.

The operating mode of the hybrid vehicle 1 is selected based on the input data to the ECU 10 while with reference to a map and a formula stored in the ECU 10, and an output power of the engine 9 and an output power (i.e., a speed and a torque) of the motor 2 are set in accordance with the selected operating mode. Then, the ECU 10 sends command signals to the inverter 5 and actuators (not shown) for controlling an opening degree of a throttle valve of the engine 9, a fuel injection amount, an ignitor and so on.

Specifically, the operating mode of the hybrid vehicle 1 may be selected based mainly on an SOC level of the battery 6. For example, the EV mode is selected in a case that the SOC level of the battery 6 is higher than a first threshold level $\alpha$, and shifted to the HV mode when the SOC level of the battery 6 falls below the first threshold level $\alpha$. In the HV mode, the electric power is supplied to the motor 2 from the battery 6. For example, the electric power is supplied to the motor 2 from the battery 6 when a required power as a product of a required drive force and a current vehicle speed cannot be achieved the electric power supplied to the motor 2 from the generator 8, or when a reduction amount (or reduction rate) of a fuel energy amount according to a remaining fuel in a fuel tank is large. In the HV mode, the operating mode is shifted to the EV mode when the SOC level of the battery 6 exceeds a second threshold level $\beta$ that is higher than the first threshold level $\alpha$.

If a relatively large power is required during propulsion in the HV mode, an amount of the electric power outputted from the battery 6 is increased. For example, in a case that a difference of elevation between a current position or a starting point of the hybrid vehicle 1 and a destination of the hybrid vehicle 1 is large, a large power (or drive force) required frequently and hence the electric power of the battery 6 is consumed to achieve the required power. Similarly, in a case that a large power (or drive force) is required frequently due to driving preference of a driver, the electric power of the battery 6 is consumed to achieve the required power. In those cases, the SOC level of the battery 6 may fall abruptly to the lower limit level even if the operating mode is shifted to the HV mode. In this situation, if a large power (or drive force) required, the electric power may not be supplied sufficiently to the motor 2 from the battery 6 to achieve the required power.

In order to avoid such disadvantage, the control system according to the embodiment is configured to raise the first threshold level $\alpha$ to shift the operating mode earlier from the EV mode to the HV mode, if a large power is expected to be required during propulsion in the EV mode. To this end, the control system according to the embodiment executes a routine shown in FIG. 2.

At step S1, it is determined whether the hybrid vehicle 1 is propelled in the EV mode. For example, such determination at step S1 may be made based on a flag representing a selection of the EV mode that is turned on when the EV mode is selected. Instead, the selection of the EV mode may also be determined based on a fact that the SOC level of the battery 6 has not yet fallen below the first threshold level $\alpha$, that the SOC level of the battery 6 has not yet fallen below the first threshold level $\alpha$ after exceeding the second threshold level $\beta$, or that the engine 9 is in operation.

If the hybrid vehicle 1 is not currently propelled in the EV mode so that the answer of step S1 is NO, the routine returns without carrying out any specific control. By contrast, if the hybrid vehicle 1 is currently propelled in the EV mode so that the answer of step S1 is YES, the routine progresses to step S2 to determine whether a current required power can be achieved by generating the maximum output power of the engine 9. In other words, at step S2, it is determined whether the required power can be achieved without supplying the electric power to the motor 2 from the battery 6 given that the hybrid vehicle 1 is propelled in the HV mode. At step S2, specifically, it is determined whether a required output Pre of the battery 6 is greater than an electric power Pg possible to be supplied to the motor 2 by generating the maximum output power of the engine 9 (to be called the "generated electric power" Pg hereinafter). In other words, at step S2, it is determined whether a required power is greater than a drive power established by generating the maximum output power of the engine 9. Here, in the following explanations, an operating mode in which the hybrid vehicle 1 is propelled in the HV mode without supplying the electric power to the motor 2 from the battery 6 will be called the engine mode.

The required power is a product of the current vehicle speed and the required drive force governed by a position of the accelerator pedal. That is, the required power is increased with a depression of the accelerator pedal. On the other hand, the maximum drive in the engine ode (or the generated electric power Pg) is a fixed value, and hence the position of the accelerator pedal to generate the maximum drive in the engine mode is also a fixed value. At step S2, therefore, it is also possible to determine whether the accelerator pedal is depressed deeper than a predetermined value. In this case, the position of the accelerator pedal may be detected by the accelerator sensor.

In addition, the required output Pre of the battery 6 is a product of a voltage of the battery 6 and the current of the battery 6. That is, given that an output voltage of the battery 6 is a fixed value, the current of the battery 6 and the required output Pre of the battery 6 may be treated as a same parameter. At step S2, therefore, it is also possible to determine whether the current of the battery 6 higher than a predetermined value based on the maximum drive power in the engine mode. In this case, energy consumption may be calculated taking account of electric consumptions of auxiliaries. Specifically, the required output Pre of the battery 6 may be obtained based on an output signal transmitted from the ECU 10, and the current of the battery 6 may be measured by an ammeter arranged in an electric circuit.

Accordingly, the required power (or the required output Pre) during propulsion in the EV mode, the position of the accelerator pedal, and the current of the battery 6 correspond to the "running condition" of the embodiment.

If the required output Pre of the battery 6 is smaller than the generated electric power Pg so that the answer of step S2 is NO, the routine returns without carrying out any specific control. By contrast, if the required output Pre of the battery 6 is greater than the generated electric power Pg so that the answer of step S2 is YES, the routine progresses to step S3 to add a difference $\Delta P$ between the required output Pre and a predetermined output Pth (that is, deficiency in power) to an integral energy W stored in the ECU 10. Specifically, the deficiency $\Delta P$ in power calculated in the current routine is added to the integral energy W that has been integrated in the past routine(s). That is, the integral energy W may be obtained based on $\int \Delta P dt$.

As described, the electric power accumulated in the battery 6 will be consumed if a large power is required during propulsion in the HV mode. That is, if a large power is required during propulsion in the EV mode, the large power may be required continuously even after shifting the operating mode to the HV mode. Therefore, it is preferable to charge the battery 6 with surplus electricity when shifting the operating mode to the HV mode. To this end, an extra amount of the electric power to charge the battery 6 is calculated at step S3. Instead, at step S3, it is also possible to calculate a difference between the above-mentioned predetermined current value of the battery 6 and an actual current value outputted from the battery 6, to multiply the calculated difference by a voltage of the battery 6, and to add the multiplied value to the integral energy W calculated in the previous routine. Here, at step S3, the predetermined output Pth may be set not only to the generated electric power Pg but also to a value smaller than the generated electric power Pg taking account of a temperature and a variation.

Then, at step S4, the first threshold level $\alpha$ is raised based on the integral energy W calculated at step S3. Specifically, an electric energy in the amount of the integral energy W is added to an initial value (i.e., level) of the first threshold level $\alpha$, and the first threshold level $\alpha$ is raised to the level raised by the electric energy in the amount of the integral energy W. Thereafter, the routine returns.

Next, a temporal change in the first threshold level $\alpha$ during execution of the routine shown in FIG. 2 will be explained with reference to FIGS. 3A, 3B and 3C. FIG. 3A shows an example of a change the required output Pre during propulsion in the EV mode. In the situation shown in FIG. 3A, the required output Pre exceeds the generated electric power Pg in a first period L1 and a second period L2. That is, the answer of step S2 will be YES in the first period L1 and the second period L2. Consequently, as indicated in FIG. 3B, the integral energy W is increased in the first period L1. Then, the integral energy W is maintained constant between the first period L1 and the second period L2, and further increased in the second period L2. As a result, as indicated in FIG. 3C, the first threshold level $\alpha$ is raised in the first period L1 to the level corresponding to the increase in the integral energy W. Then, the first threshold level $\alpha$ is maintained to a constant level between the first period L1 and the second period L2, and further raised in the second period L2. Thus, the first threshold level $\alpha$ is raised to advance the timing to shift the operating mode from the EV mode to the HV mode.

Figure 4:
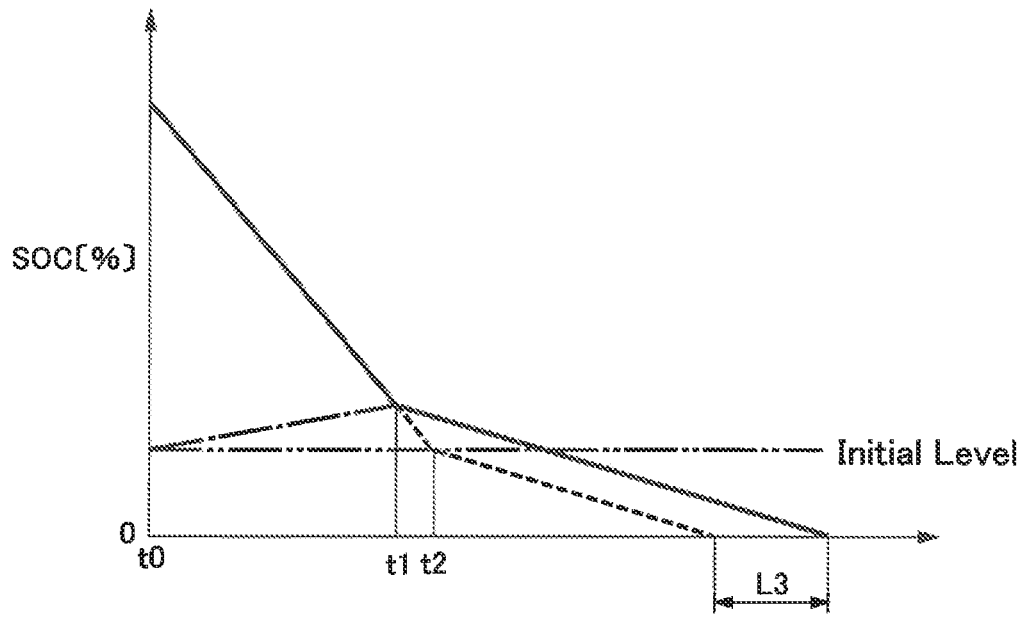
FIG. 4 is a graph indicating a reduction in the SOC level of a case in which a predetermined power is required.

Here will be explained a reduction in the SOC level of the battery 6 during execution of the routine shown in FIG. 2 with reference to FIG. 4. In FIG. 4, the required output Pre is indicated as a constant value greater than the generated electric power Pg for the sake of convenience. In FIG. 4, a change in the SOC level during execution of the routine shown in FIG. 2 is indicated by the solid line, a change in the SOC level without executing the routine shown in FIG. 2 is indicated by the dashed line, a change in the first threshold level $\alpha$ during execution of the routine shown in FIG. 2 is indicated by the dashed-dotted line, and the initial level of the first threshold level $\alpha$ is indicated by the two-dotted-dashed line.

During a period from point t0 to t1, the SOC level is relatively high and hence the hybrid vehicle 1 is propelled in the EV mode. In this situation, the SOC level falls at a substantially constant rate, and the answer of step S2 is YES. Therefore, the first threshold level $\alpha$ increases proportionally. Then, when the SOC level falls below the first threshold level $\alpha$ at point t1, the operating mode is shifted from the EV mode to the HV mode. As described, in the situation shown in FIG. 4, the required output Pre is constant and greater than the generated electric power Pg. Therefore, although the operating mode is shifted to the HV mode, the required output Pre may not be achieved. In this situation, therefore, the battery 6 also discharges the electric power.

Figure 2:
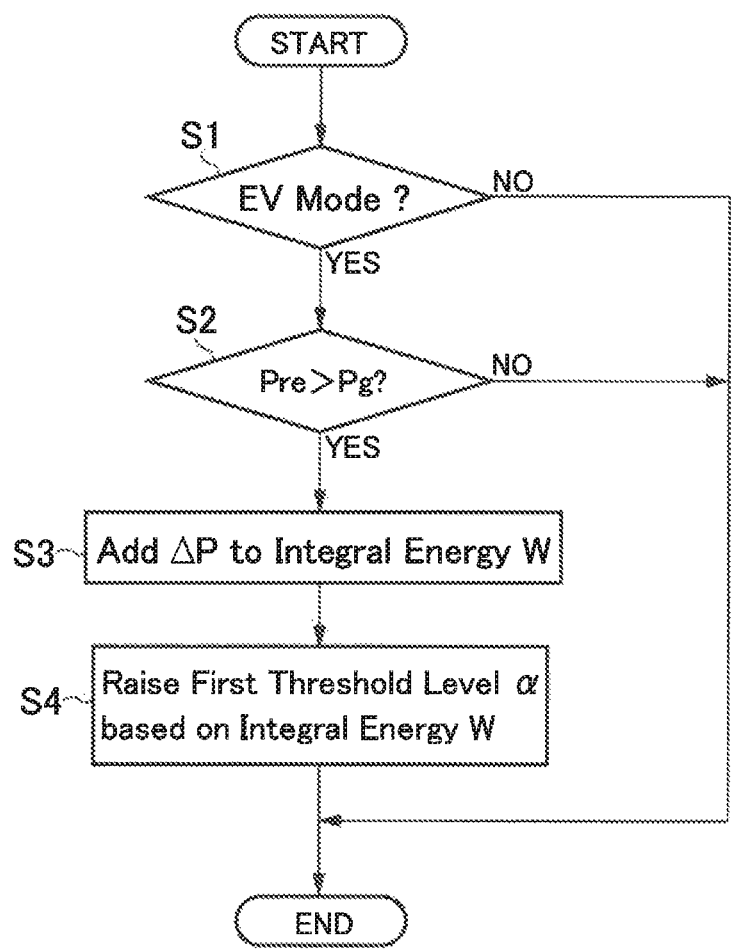
FIG. 2 is a flowchart showing a an example of a routine executed by a control system according to the embodiment of the present disclosure.
Figure 3A:
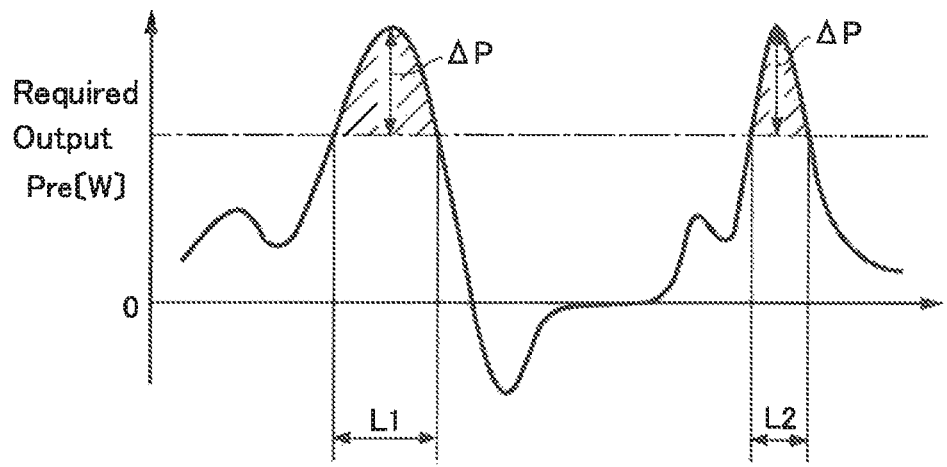
FIGS. 3A, 3B and 3C show graphs indicating a change in a first threshold SOC level.
Figure 3B:
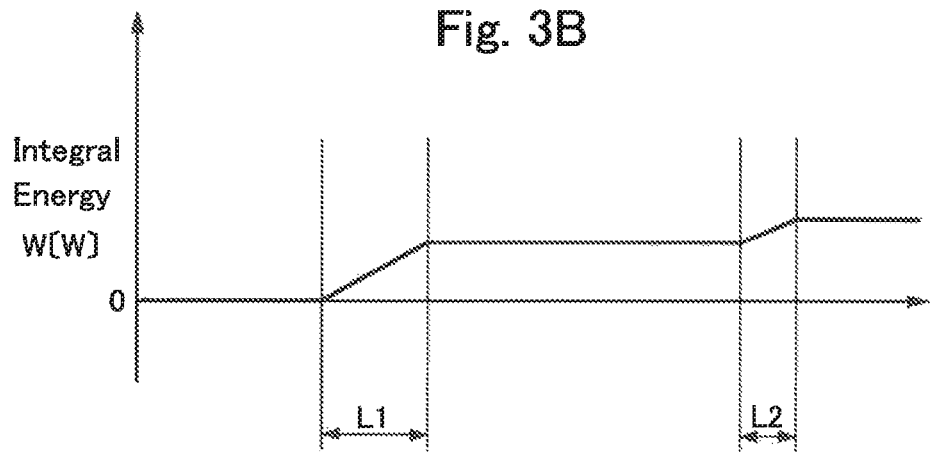
Figure 3C:
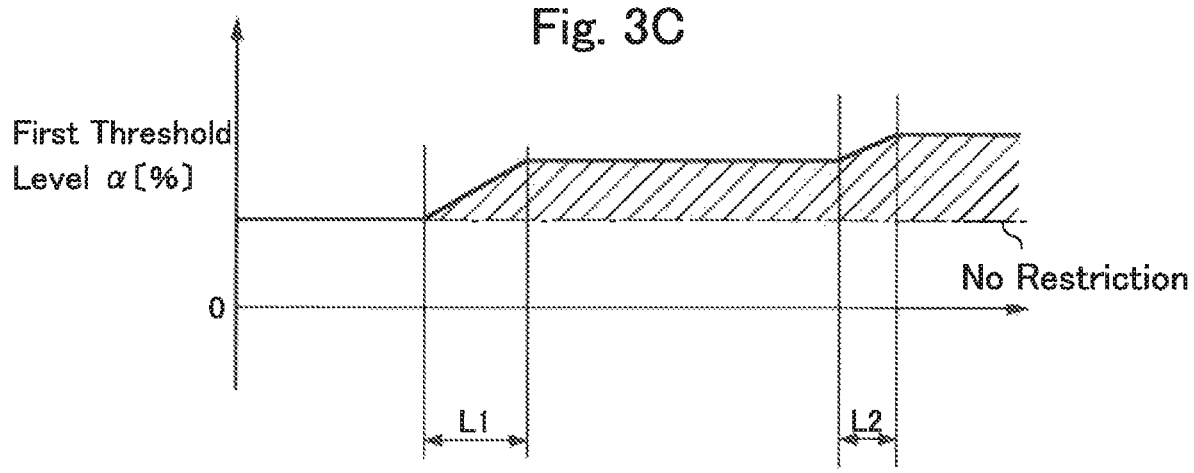

By contrast, in the case that the routine shown in FIG. 2 is not executed, the SOC level has not yet fallen below the initial level of the first threshold level $\alpha$ at point t1, and hence the operating mode is maintained to the EV mode. Then, the SOC level falls below the initial level of the first threshold level $\alpha$ at point t2 and hence the operating mode is shifted to the HV mode. That is, by executing the routine shown in FIG. 2, the SOC level of the battery 6 can be maintained to the higher level than that of the case in which the routine shown in FIG. 2 is not executed.

In the case of executing the routine shown in FIG. 2, the electric power generated by the output power of the engine 9 is supplied to the motor 2 to compensate for the shortage of the electric power after point t1. In this case, therefore, a reduction rate of the SOC level is reduced after point t1. Meanwhile, in the case that the routine shown in FIG. 2 is not executed, the electric power generated by the output power of the engine 9 is supplied to the motor 2 to compensate for the shortage of the electric power after point t2. In this case, therefore, the reduction rate of the SOC level is reduced after point t2. However, in any of those cases, the battery 6 discharges the electric power and hence the SOC level is lowered. Here, in the HV mode, the engine 9 generates power and the battery 6 discharges the electric power in a same manner in both cases. Therefore, the reduction rate of the SOC level is also same in both cases.

As a result of executing the routine shown in FIG. 2, timing at which the SOC level falls to the lower limit level may be delayed over a period L3 shown in FIG. 4. That is, the required output Pre may be discharged from the battery 6 for a longer period of time. In other words, the electric power may be supplied continuously to the motor 2 from the battery 6 even if a large power (or drive force) is demanded frequently. For this reason, the required power (or drive force) can be generated continuously.

Figure 5:
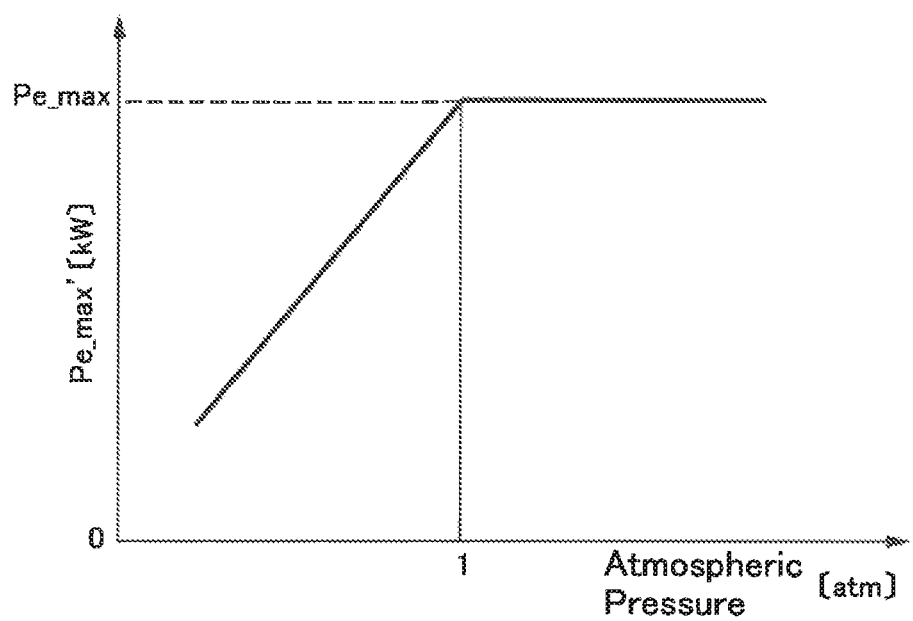
FIG. 5 is a graph indicating a change in a maximum output power of the engine depending on altitude.

For example, when the hybrid vehicle 1 travels to a higher altitude (i.e., to a highland) and hence a large power is required, a maximum output power Pe_max' of the engine 9 after shifting the operating mode to the HV mode would be reduced from a maximum output power Pe_max of the engine 9 operated at 1 atm of pressure. This is because air density decreases as altitude increases. That is, an amount of air supply to the engine 9 is reduced as altitude increases. A relation between an atmospheric pressure and the maximum output power Pe_max of the engine 9 is indicated in FIG. 5. As indicated in FIG. 5, the maximum output power Pe_max of the engine 9 is reduced with a reduction in the atmospheric pressure.

That is, if the hybrid vehicle 1 travels in a high altitude, a frequency to supply the electric power to the motor 2 or an output amount of the battery 6 is increased even after shifting the operating mode to the HV mode, in comparison with a case of travelling on a low altitude (at 1 atm). Therefore, it is preferable to accumulate the electric power in the battery 6 as much as possible. For this purpose, the control system according to the embodiment is configured to correct the integral energy W calculated at step S3 according to altitude. Specifically, the control system is further configured: to multiply the integral energy W calculated at step S3 by a ratio of the maximum output power Pe_max' of the engine 9 at the current location to the maximum output power Pe_max of the engine 9 at the low altitude (Pe_max'/Pe_max); and to raise the first threshold level $\alpha$ based on the integral energy W thus multiplied. To this end, a relation between the maximum output power Pe_max' of the engine 9 at the current location and the atmospheric pressure is determined based on a result of experiment, and stored in the ECU 10 in the form of a map shown in FIG. 5. The atmospheric pressure at the current location may be measured by a barometer or from current information stored in a navigation system. Instead, the integral energy W may also be correct by multiplying the integral energy W by a correction coefficient set at each predetermined atmospheric pressure. In this case, the integral energy W is updated stepwise.

By thus adjusting the first threshold level α while correcting the integral energy W based on the atmospheric presser at the current location, reduction in the SOC level below the lower limit level earlier than expected can be prevented with changes in the atmospheric pressure. For this reason, the required power may be generated for a longer period of time.

If a period of time in which the integral energy W is integrated is too long, the integral energy W would be increased excessively; and the first threshold level α, would be raised too high. In this case, the operating mode would be shifted to the HV mode too early, and shifted again to the EV mode after running out of fuel. In the hybrid vehicle 1, the engine 9 serves as an assist prime mover that is activated when the SOC level of the battery 6 falls to the lower limit level. Therefore, it is not preferable to consume the fuel too early. By contrast, if the period of time in which the integral energy W is integrated is too short, it is difficult to predict that a large power will be required in the future. In other words, the battery 6 cannot be charged sufficiently in advance to generate an expected required power; and hence the SOC level of the battery 6 would fall to the lower limit level earlier than expected. In this case, the motor 2 is operated only by the generated electric power Pg, and hence the require power may not be achieved. In order to avoid such disadvantage, it is preferable to integrate the deficiency ΔP over a past period of time corresponding to an expected possible running period T from a current point of time given that the operating mode is shifted to the HV mode at the current point of time.

Here will be explained an example of calculating the expected possible running period T. First of all, an expected possible engine running period Te as a period of time that the hybrid vehicle 1 can be powered only by the engine 9 is calculated based on a current fuel amount in a tank. Specifically, the expected possible engine running period Te can be calculated using the following formula:

$$Te=Pf/(Pave/\eta m/\eta e)$$

where Pf is a remaining fuel energy, Pave is an average required power, ηm is an efficiency of the motor 2, and ηe is a thermal efficiency of the engine 9.

The remaining fuel energy Pf may be calculated by multiplying a calorific value (kj/kg) according to a kind of the fuel by a remaining fuel amount. The efficiency ηm of the motor 2 and the thermal efficiency ηe of the engine 9 are changed depending on outputs of the motor 2 and the engine 9. Therefore, maps determining relations between the efficiency ηm of the motor 2 and the output of the motor 2 and between the thermal efficiency ηe of the engine 9 and the output of the engine 9 are prepared based on an experimental result, and the efficiency ηm of the motor 2 and the thermal efficiency ηe of the engine 9 may be obtained with reference those maps. In order to obtain the efficiency ηm of the motor 2 and the thermal efficiency ηe of the engine 9, the average required power Pave may be used as a parameter. To this end, the average required power Pave may be calculated by adding a required deceleration to a required acceleration. That is, the average required power Pave is increased with an increase in the required acceleration, and decreased with an increase in the required deceleration so that the battery 6 is charged with a generated electric power.

When the SOC level of the battery 6 falls below the first threshold level α, the hybrid vehicle 1 is propelled by the electric power generated by the generator 8, and by the electric power accumulated in the battery 6 according to need. However, as described above, the expected possible engine running period Te is calculated given that the hybrid vehicle 1 is powered only by the electric power generated by the generator 8. That is, the calculated expected possible engine running period Te may be different from an actual possible running period. Therefore, the integral energy W is calculated temporarily using the calculated expected possible engine running period Te, and then the calculated integral energy W per unit of time (=W/t) is subtracted from the average required power Pave. Then, the expected possible running period T is calculated by assigning the subtracted value (Pave−W/t) to the average required power Pave. Thereafter, the first threshold level α is adjusted based on the deficiency ΔP integrated over the past period of time corresponding to the expected possible running period T thus calculated.

By thus adjusting the first threshold level α based on the deficiency ΔP integrated over the past period of time corresponding to the expected possible running period T, the operating mode may be shifted to the HV mode at an appropriate timing. For this reason, the fuel will not run out earlier than expected, and the SOC level of the battery 6 will not fall to the lower limit level earlier than expected. In other words, a timing at which the furl runs out will not be shifted significantly from a timing at which the SOC level of the battery 6 falls to the lower limit level.

As described, the engine 9 serves as an assist prime mover that is activated when the SOC level of the battery 6 falls to the lower limit level, therefore, it is not preferable to consume the fuel too early. In addition, in order to generate the required power continuously, it is not preferable that the SOC level of the battery 6 falls to the lower limit level too early. That during propulsion in the HV mode, it is not preferable to excessively consume one of the energies such as the electric power and the fuel. Therefore, the control system according to the embodiment is configured to shift the operating mode to the HV mode in such a manner as to maintain a constant ratio between the fuel energy according to the remaining fuel and a battery energy according to the SOC level at the point when the operating mode is shifted to the HV mode. Specifically, the control system is configured to set a contribution ratio between the required power of the engine 9 and the required power of the battery 6 to the constant ratio between the fuel energy and the battery energy at the point when the operating mode is shifted to the HV mode, and to output the electric power always from the battery 6 irrespective of magnitude of the required power. Here, when the electric power is generated by establishing a brake torque by the motor 2 when decelerating, the generated electric power is supplied to the battery 6. In this situation, therefore, a proportion of the required power of the battery 6 may be increased during propulsion. Thus, after shifting the operating mode to the HV mode, the output power of the motor 2 is set based on the remaining fuel and the SOC level.

By thus propelling the hybrid vehicle 1 while maintaining the ratio between the fuel energy and the battery energy to a constant ratio after shifting to the HV mode, the engine 9 is allowed to serve as the assist prime mover when the SOC level of the battery 6 fall to the lower limit level, and the required power can be generated certainly. In addition, the timing at which the furl runs out and the timing at which the SOC level of the battery 6 falls to the lower limit level may be synchronized to each other.

For example, the first threshold level α is returned to the initial level when the electric power is regenerated amply as a result of travelling down a hill so that the SOC level exceeds the second threshold level β and hence the operating mode is shifted from the HV mode to the EV mode. Optionally, the first threshold level α may also be returned to the initial level when the electric power source the hybrid vehicle 1 is turned off.

Although the above exemplary embodiments of the present disclosure have been described, it will be understood by those skilled in the art that the present disclosure should not be limited to the described exemplary embodiments, and various changes and modifications can be made within the scope of the present disclosure.

For example, the control system according to the embodiment may also be applied to a parallel type hybrid vehicle and a split type hybrid vehicle in which an output torque of an engine is also delivered to wheels in addition to an output torque of a motor.

What is claimed is:

1. A control system for a hybrid vehicle comprising:
an engine;
a motor; and
an electric storage device that supplies an electric power to the motor,
wherein an operating mode is selected from a hybrid mode in which the hybrid vehicle is propelled by a power generated by the engine, and an electric vehicle mode in which the hybrid vehicle is propelled by supplying the electric power to the motor from the electric storage device while stopping the engine, and
a drive power established by generating maximum output power of the engine is smaller than a drive power established by supplying a maximum electric power to the motor from the electric storage device,
the control system comprising:
a controller that selects the operating mode of the hybrid vehicle from the hybrid mode and the electric vehicle mode,
wherein the controller is configured to
shift the operating mode from the electric vehicle mode to the hybrid mode when a state of charge level of the electric storage device falls below a threshold level,
raise the threshold level when a required running condition during propulsion in the electric vehicle mode is a condition that cannot be achieved by operating the engine without supplying the electric power to the motor from the electric storage device given that the hybrid vehicle is propelled in the hybrid mode, the required running condition including a required power, and
raise the threshold level when the required power is greater than the drive power established by generating the maximum output power of the engine.

2. The control system for the hybrid vehicle as claimed in claim 1, wherein the controller is further configured to
calculate an integral energy by integrating a difference between the required power greater than a predetermined power and the predetermined power during propulsion in the electric vehicle mode, and
raise the threshold level to a level corresponding to an increase in the integral energy.

3. The vehicle control system for the hybrid vehicle as claimed in claim 2, wherein the predetermined power includes the drive power established by generating the maximum output power of the engine.

4. The vehicle control system for the hybrid vehicle as claimed in claim 2, wherein the controller is further configured to
obtain an altitude at a current location, and
correct the integral energy such that the integral energy is increased as the altitude increases.

5. The vehicle control system for the hybrid vehicle as claimed in claim 2, wherein the controller is further configured to
calculate an expected possible running period from a current point of time given that the operating mode is shifted to the hybrid mode at the current point of time based on a remaining fuel amount and the state of charge level of the electric storage device, and
calculate the integral energy by integrating the difference between the required power greater than the predetermined power and the predetermined power over a past period of time corresponding to the expected possible running period.

6. The vehicle control system as claimed in claim 1, wherein the controller is further configured to control an output power of the engine and an output power of the electric storage device to maintain a constant ratio between an energy amount of the fuel supplied to the engine and the state of charge level of the electric storage device, when the state of charge level of the electric storage device falls below the threshold level so that the operating mode is shifted from the electric vehicle mode to the hybrid mode.

7. The vehicle control system as claimed in claim 1, further comprising:
a generator that translates the power of the engine into an electric power, and
wherein the hybrid mode includes a mode in which the motor is operated to generate a power by supplying the electric power generated by the generator at least partially.

* * * * *